US008927124B2

(12) United States Patent
Moon et al.

(10) Patent No.: US 8,927,124 B2
(45) Date of Patent: Jan. 6, 2015

(54) BATTERY PACK

(75) Inventors: Dea-Yon Moon, Yongin-si (KR);
Sang-Hun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 269 days.

(21) Appl. No.: 13/305,648

(22) Filed: Nov. 28, 2011

(65) Prior Publication Data
US 2012/0214025 A1 Aug. 23, 2012

(30) Foreign Application Priority Data

Feb. 17, 2011 (KR) ........................ 10-2011-0014140

(51) Int. Cl.
*H01M 14/00* (2006.01)
*H01M 2/10* (2006.01)
*H01M 2/20* (2006.01)
*H01M 10/42* (2006.01)

(52) U.S. Cl.
CPC ............ *H01M 2/1061* (2013.01); *H01M 2/204* (2013.01); *H01M 10/425* (2013.01)
USPC ................................... 429/7; 429/96; 429/99

(58) Field of Classification Search
CPC . H01M 2/1061; H01M 10/425; H01M 2/204; Y02E 60/12
USPC .......................................................... 429/7
See application file for complete search history.

(56) References Cited

U.S. PATENT DOCUMENTS

| 4,675,259 A * | 6/1987 | Totty .............................. 429/157 |
| 6,822,420 B2 * | 11/2004 | Kozu et al. .................... 320/107 |
| 2008/0081254 A1 * | 4/2008 | Kim et al. ...................... 429/163 |

FOREIGN PATENT DOCUMENTS

| JP | 10-340710 | | 12/1998 | |
| JP | 10340710 A | * | 12/1998 | .............. H01M 2/10 |
| JP | 11-111250 | | 4/1999 | |
| JP | 2001-266820 A | | 9/2001 | |
| JP | 3507397 B2 | | 12/2003 | |
| JP | 2004-356027 | | 12/2004 | |
| JP | 2008-192447 | | 8/2008 | |

OTHER PUBLICATIONS

English Machine Translation of JP 2001-266820 A, 26 pages.
English Machine Translation of JP 2008-192447, 15 pages.
KIPO Office action dated Jul. 13, 2012, for Korean priority Patent application 10-2011-0014140, (5 pages).
Patent Abstracts of Japan, and English machine translation of Japanese Publication 10-340710 listed above, (23 pages).
Patent Abstracts of Japan, and English machine translation of Japanese Publication 11-111250 listed above, (25 pages).
Patent Abstracts of Japan, and English machine translation of Japanese Publication 2004-356027 listed above, (80 pages).

* cited by examiner

*Primary Examiner* — Gary Harris
(74) *Attorney, Agent, or Firm* — Christie, Parker & Hale, LLP

(57) ABSTRACT

A battery pack including: a core pack including a plurality of unit cells; a frame accommodating the core pack; and a cover covering the core pack, the cover including a bead corresponding to the unit cells, and including a metal.

15 Claims, 9 Drawing Sheets

BATTERY PACK

CROSS-REFERENCE TO RELATED APPLICATION

This application claims priority to and the benefit of Korean Patent Application No. 10-2011-0014140, filed in the Korean Intellectual Property Office on Feb. 17, 2011, the entire content of which is incorporated herein by reference.

BACKGROUND

1. Field

One or more embodiments of the present invention relate to a battery pack, and more particularly, to a structure of a battery pack.

2. Description of Related Art

As wireless Internet and communication technology have developed, supply of portable computers capable of operating by using a battery without an external power supply unit is rapidly increasing. In general, portable computers are small and easy to carry, and thus the portable computers are widely used for business use or individual use. Portable computers may include a battery pack embedded therein in order to be used in various places regardless of availability of an external power supply unit. Also, an embedded battery pack may include a secondary battery that may be repeatedly charged and discharged.

SUMMARY

Aspects of embodiments of the present invention are directed toward a battery pack that fixes a plurality of unit cells and includes a metal cover having improved flatness and rigidity.

Additional aspects will be set forth in part in the description which follows and, in part, will be apparent from the description, or may be learned by practice of the presented embodiments.

An embodiment of the present invention provides a battery pack including a core pack including a unit cell; a frame accommodating the core pack; and a cover covering the core pack, the cover including a bead corresponding to the unit cell, and including a metal.

The core pack may include a plurality of unit cells, and the bead may include a first bead formed to correspond to a space between the unit cells.

The unit cell may include an accommodating unit that includes a receiving unit accommodating an electrode assembly and a terrace portion covering a part of an electrode terminal extending from the electrode assembly, and the bead may include a second bead formed to correspond to the terrace portion.

The core pack may include a plurality of unit cells; the bead may include the first bead formed to correspond to a space between the unit cells; the first bead extends in a first direction; the second bead extends in a second direction; and the first direction is different from the second direction.

The first direction may be perpendicular to the second direction.

A height of the first bead may be the same as a height of the second bead. The height of the first bead may be equal to or less than a height of the second bead.

The cover may include a first region cover corresponding to at least a part of the unit cell and a second region cover extending from the first region cover and formed to be on a different plane than the first region cover.

The first region cover may be closer to the unit cell than the second region cover.

A step formed between the first region cover and the second region cover may be formed in the cover corresponding to at least one edge of the core pack.

The cover may include a first cover covering one side of the core pack and a second cover covering another side of the core pack.

The battery pack may further include a protection circuit module electrically connected to the core pack, wherein the frame may include a first region accommodating the core pack and a second region accommodating the protection circuit module, and the cover covers the core pack and the protection circuit module.

The cover may include stainless steel.

The battery pack may further include an insulating member between the core pack and the cover. The insulating member may include a polyamide tape.

The unit cell may include a polymer battery.

The battery pack may be configured to be used in a portable computer.

BRIEF DESCRIPTION OF THE DRAWINGS

These and/or other aspects will become apparent and more readily appreciated from the following description of the embodiments, taken in conjunction with the accompanying drawings.

DETAILED DESCRIPTION

Figure 1:
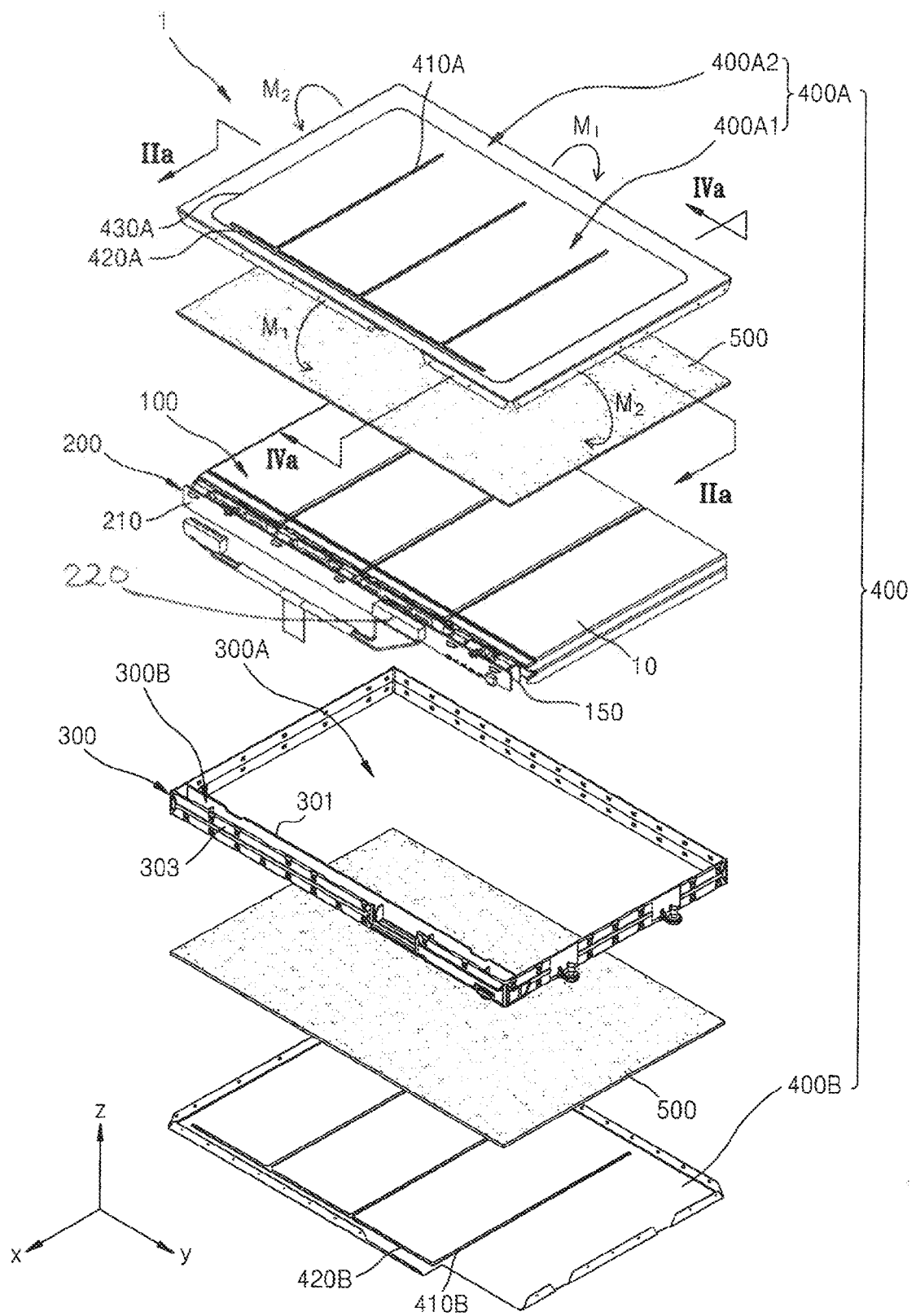
FIG. 1 is a schematic exploded perspective view of a battery pack according to an embodiment of the present invention.

Hereinafter, the present invention will be described more fully with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive. Further, like reference numerals designate like elements throughout the specification.

Throughout this specification and the claims that follow, when it is described that an element is "coupled" to another element, the element may be "directly coupled" to the other element or "electrically coupled" to the other element through one or more third elements. In addition, unless explicitly described to the contrary, the word "comprise" and variations such as "comprises" or "comprising" will be understood to imply the inclusion of stated elements but not the exclusion of any other elements.

FIG. 1 is a schematic exploded perspective view of a battery pack 1, according to an embodiment of the present invention.

Referring to FIG. 1, the battery pack 1 includes a core pack 100, a protection circuit module 200, a frame 300, a cover 400, and an insulating member 500.

As shown in FIG. 1, the core pack 100 includes a plurality of unit cells 10. In one embodiment, the core pack 100 includes at least two unit cells 10. The unit cell 10 may be a secondary battery, for example, a lithium secondary battery. The unit cell 10 may be a polymer battery.

In one embodiment, the plurality of unit cells 10 are connected to one another in series or in parallel to constitute the core pack 100. Referring to the embodiment shown in FIG. 1, the core pack 100 includes eight unit cells 10. That is, the core pack 100 includes four pairs of unit cells 10, each pair including two unit cells 10 that are connected to each other in parallel, wherein the four pairs of unit cells 10 are connected to one another in series. However, the present invention is not limited thereto, and the number of unit cells 10 constituting the core pack 100 and a method of connecting the unit cells 10 may be modified in various ways. The core pack 100 may supply power to various electronic devices. For example, the core pack 100 or the battery pack 1 accommodating the core pack 100 may supply power to a portable computer or a power tool.

In one embodiment, the protection circuit module 200 is electrically connected to the core pack 100. For example, the protection circuit module 200 may be electrically connected to the core pack 100 via a connection tab 150. The protection circuit module 200 may prevent overheating and/or explosion from occurring due to an overcharge, overdischarge, or overcurrent state of the core pack 100. The protection circuit module 200 may include a substrate 210 located at one side of the core pack 100 and a protection device 220 mounted on the substrate 210. In one embodiment, the protection device 220 is selectively formed of a safety device including a passive device, such as a resistor or a capacitor, or an active device such as a field-effect transistor (FET), or may be formed of integrated circuits. In this regard, the protection device 220 may include, for example, a positive temperature coefficient (PTC) device.

In one embodiment, the battery pack 1 includes a display unit (not shown) so as to display an electrical characteristic of the core pack 100 by receiving a user's input. For example, the display unit (not shown) may display a state of the core pack 100, for example, a charging time, a charging degree, a residual charging amount, and a power source of the core pack 100.

In one embodiment, the frame 300 is configured to accommodate the core pack 100 and the protection circuit module 200. The frame 300 includes a first region 300A and a second region 300B. The first region 300A and the second region 300B may be divided by a dividing wall 301. The first region 300A and the second region 300B may accommodate the core pack 100 and the protection circuit module 200, respectively. In one embodiment, the frame 300 includes an insulating material. For example, the frame 300 may constitute a high molecular weight compound that may be molded by plastic deformation using heat and/or pressure. The frame 300 including the first region 300A and the second region 300B may be formed as one body (e.g., a single body). However, the present invention is not limited thereto, and the frame 300 may be formed from a plurality of components or parts.

If the core pack 100 includes a polymer battery and the frame 300 is formed by hot injection molding by putting the pack 100 and the protection circuit module 200 in a mold, an operational problem may occur in a PTC device included in the protection circuit module 200 during the heating of the molded frame 300. However, in embodiments of the present invention, the frame 300 is separately formed from the core pack 100 and the protection circuit module 200 and is coupled to the core pack 100 and the protection circuit module 200 after formation, and thus an operational problem may not occur in the PTC device included in the protection circuit module 200, thereby decreasing defects.

At this time, a first aperture may be formed in at least one of a first side surface or a second side surface in a Z-axis direction of the first region 300A. In FIG. 1, the first aperture is formed in opposite sides of the first region 300A. The second region 300B may include a space between the dividing wall 301 and one terminal (not shown) located to face the dividing wall 301 and may accommodate the protection circuit module 200 in the space. Here, the first region 300A and the second region 300B may be divided by the dividing wall 301. A supporting portion 310 may be formed in the second region 300B so as to support the protection circuit module 200.

In one embodiment, the cover 400 covers at least a part of the core pack 100, accommodates the core pack 100, and is coupled to the frame 300. For example, the insulating member 500 may be located between the cover 400 and the core pack 100. The insulating member 500 may be an insulating tape, for example, a polyamide tape. The insulating member 500 may insulate the cover 400 including a metal and the core pack 100 from each other. In one embodiment, the insulating member 500 may insulate the cover 400 and the protection circuit module 200 from each other. In this regard, the insulating member 500 may cover one surface of the cover 400. Also, the insulating member 500 may extend up to a bent portion formed at an edge portion of the cover 400.

As shown in FIG. 1, the cover 400 is divided into a first cover 400A and a second cover 400B, but the present invention is not limited thereto. For example, the cover 400 may be formed as one body (e.g., a single body). Here, the cover 400 may be formed of a metal in order to decrease a thickness of the battery pack 1. For example, the cover 400 may be formed of stainless steel (SUS). Here, the cover 400 may be formed in the form of a thin plate. When the cover 400 is formed in the form of a thin plate, the entire thickness of the battery pack 1 may be decreased.

Figure 4A:
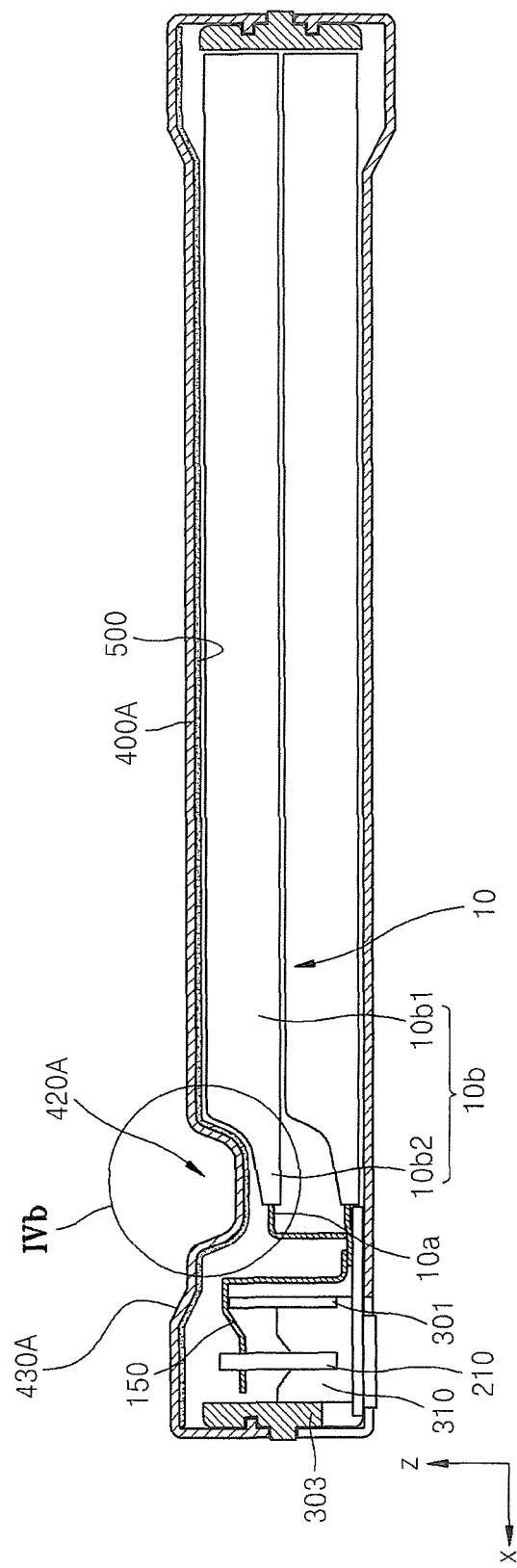
FIG. 4A is a schematic cross-sectional view taken along the line IVa-IVa of FIG. 1.

In one embodiment, since the cover 400 is formed of a thin metal, it is difficult to maintain flatness of the cover 400. Also, in the cover 400 including a metal, it is difficult to include an additional dividing wall in the cover 400 in order to reduce movement of the unit cells 10. In order to solve these problems, according to one embodiment of the present invention, a bead may be formed on the cover 400 as illustrated in FIG. 1. For convenience of description, although the bead formed on the first cover 400A will be mainly described below, a bead may also be formed on the second cover 400B. The bead may be formed to correspond to the unit cell 10, that is, to correspond to the shape of the unit cell 10. That is, the bead may be formed at a portion of the cover 400 corresponding to an edge portion of the unit cell 10 according to the unit cell 10 having a rectangular shape. Referring to FIG. 4A, for example, the bead may be formed to correspond to a terrace portion 10*b*2 or to a space between the unit cells 10.

Figure 2A:
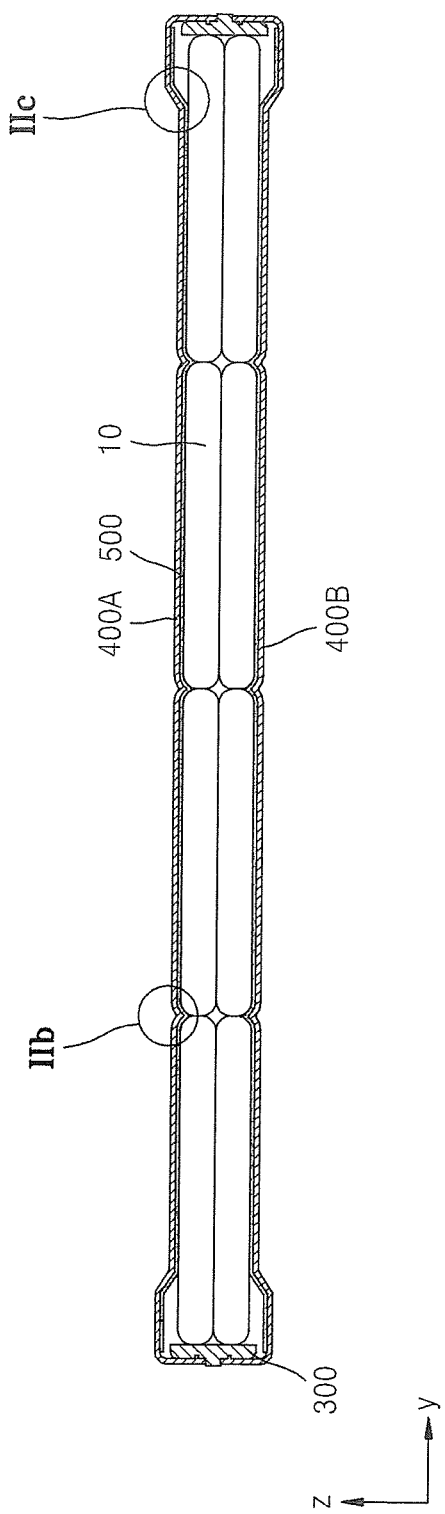
FIG. 2A is a schematic cross-sectional view taken along the line IIa-IIa of FIG. 1.
Figure 2B:
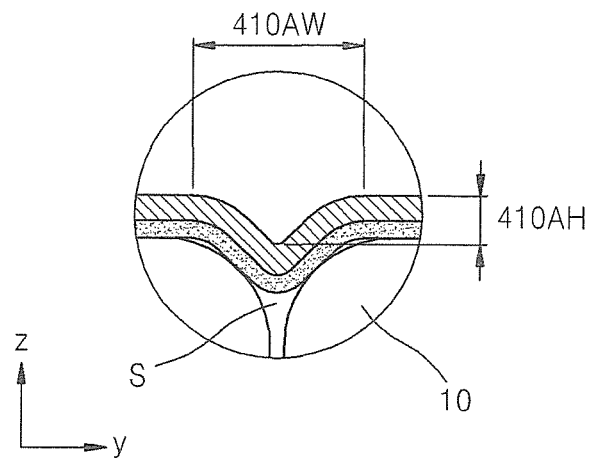
FIG. 2B is a schematic exploded cross-sectional view of a part IIb of FIG. 2A.
Figure 2C:
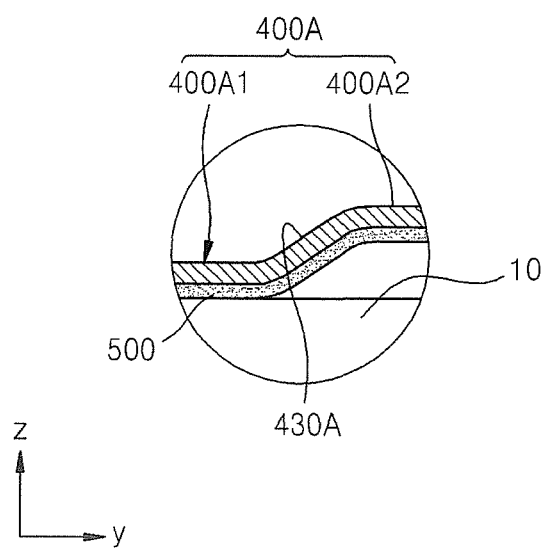
FIG. 2C a schematic exploded cross-sectional view of a part IIc of FIG. 2A.
Figure 3A:
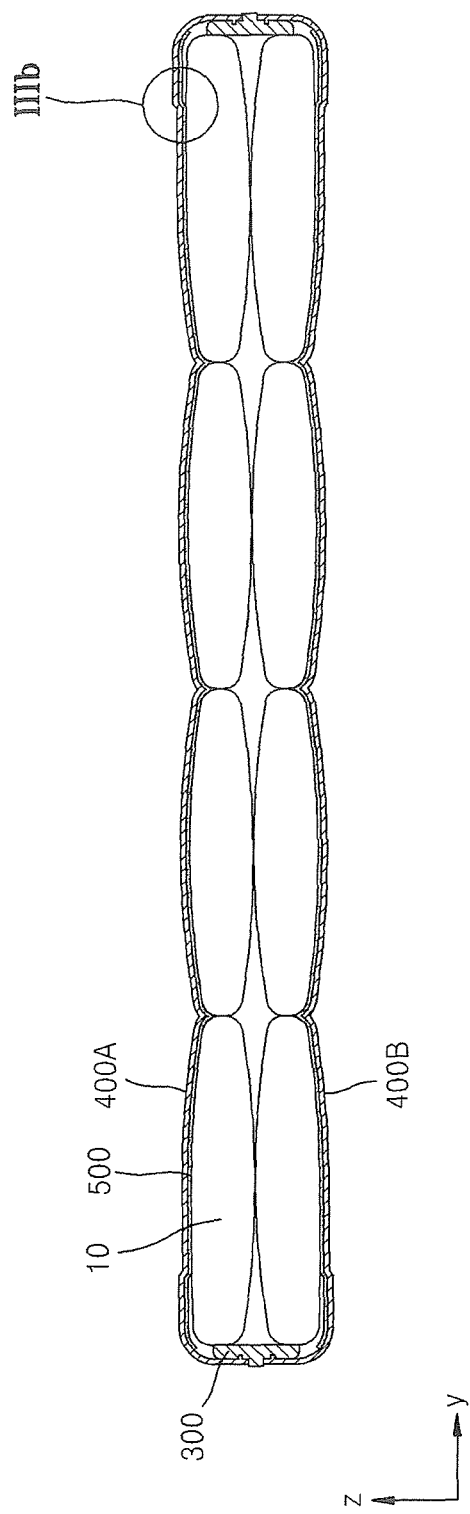
FIG. 3A is a schematic cross-sectional view of unit cells of FIG. 2A that have expanded according to an embodiment of the present invention.
Figure 3B:
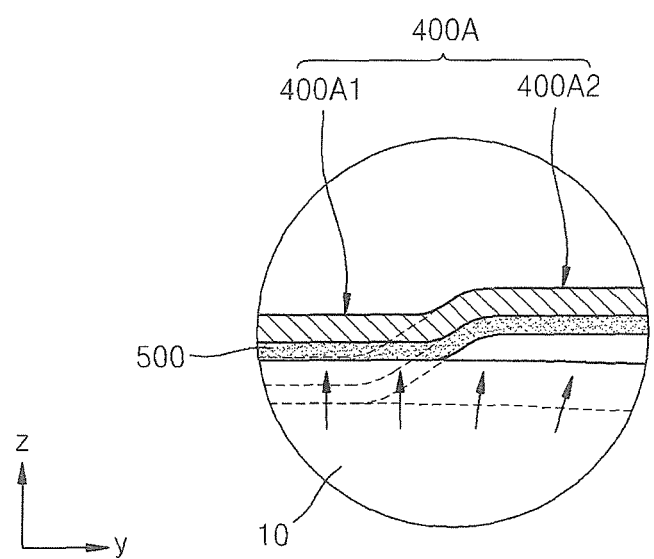
FIG. 3B is a schematic cross-sectional view of a part IIIb of FIG. 3A.

A first bead 410A and a step 430A will now be described with reference to FIGS. 2A through 3B. FIG. 2A is a schematic cross-sectional view taken along the line IIa-IIa of FIG. 1. FIG. 2B is a schematic exploded cross-sectional view of a part IIb of FIG. 2A. FIG. 2C a schematic exploded cross-sectional view of a part IIc of FIG. 2A. FIG. 3A is a schematic cross-sectional view of the unit cells 10 of FIG. 2A that have expanded, according to an embodiment of the present invention. FIG. 3B is a schematic cross-sectional view of a part IIIb of FIG. 3A. In one embodiment, the bead is formed on the first cover 400A so as to correspond to the unit cells 10. For example, the bead may include the first bead 410A. The first bead 410A may be formed to correspond to a space S between the unit cells 10, as shown in FIG. 2B. FIG. 1 illustrates three first beads 410A, but the number of first beads 410A is not limited thereto. For example, a plurality of the first beads 410A may be formed according to the number of unit cells 10.

A peak may be formed in the first bead 410A in a direction perpendicular to the unit cell 10, that is, in a Z-axis direction. In one embodiment shown in FIG. 2B, the first bead 410A is formed to have a first bead height 410AH and a first bead width 410AW. In one embodiment, the first bead height 410AH and the first bead width 410AW are determined according to the shape of the space S between the unit cells 10. In this regard, the shape of the first bead 410A is not limited to that illustrated in FIG. 2A. For example, the peak of the first bead 410A may be formed to be flat or pointed. A portion of the first bead 410A between the peak of the first bead 410A and the first cover 400A may be formed to have various inclined angles. The first bead 410A may be formed to correspond to the shape of the edge portion of the unit cell 10.

In one embodiment, the first bead 410A functions as a dividing wall so that the unit cells 10 do not move in a horizontal direction, that is, in a Y-axis direction. That is, the inclined angle of the first bead 410A may support each unit cell 10 so as to prevent each unit cell 10 from moving in a horizontal direction of the unit cell 10, that is, in a Y-axis direction.

In one embodiment, the insulating member 500 located between the first cover 400A and the unit cell 10 is formed to correspond to the shape of the first bead 410A. In this regard, the insulating member 500 may be, for example, an insulating tape, and may insulate the first cover 400A including a metal and the unit cell 10 from each other.

The unit cell 10 may be a lithium secondary battery. Accordingly, the unit cell 10 may expand and/or contract according to repetitive charging and/or discharging operations of the lithium secondary battery. In order to compensate for a volume change of the unit cell 10 due to the expansion of the unit cell 10, the first cover 400A may include a first region cover 400A1 and a second region cover 400A2, as shown in FIGS. 2C and 3B. In one embodiment, the first region cover 400A1 is formed to correspond to at least a part of the unit cell 10, and the second region cover 400A2 extends from the first region cover 400A1. In this regard, a step 430A is formed between the first region cover 400A1 and the second region cover 400A2. That is, the first region cover 400A1 is surrounded by the step 430A. For example, the first region cover 400A1 may be located so as to be closer in a Z-axis direction to the unit cell 10 than the second region cover 400A2. In one embodiment, an inclined angle of an inclined surface of the step 430A is not limited to that illustrated in FIG. 2A, and may be modified according to a design condition. In one embodiment, since the first region cover 400A1 is formed to be closer to the unit cell 10 than the second region cover 400A2, the first cover 400A functions as a plate spring with respect to the unit cells 10. As shown in FIG. 2A, the first region cover 400A1 compresses toward the unit cells 10 via the step 430A, thereby fixing the unit cells 10. In other words, in FIG. 2A, the first region cover 400A1 of the first cover 400A pushes against the unit cells 10.

As illustrated in FIGS. 3A and 3B, if the unit cells 10 expand, the first region cover 400A1 may be displaced in a direction away from the unit cells 10. Because the step 430A acts as a spring, the first region cover 400A1 of the first cover 400A maintains contact with the expanded unit cells 10. Thus, the first cover 400A increases the stability of the battery pack 1 by compensating for the increased volume of the expanded unit cells 10.

FIG. 1 illustrates the first cover 400A including the first region cover 400A1 and the second region cover 400A2 that form the step 430A therebetween, but the present invention is not limited thereto. The first region cover 400A1 and the second region cover 400A2 may be formed at least one side of the cover 400. That is, the first region cover 400A1 and the second region cover 400A2 may be formed on at least one surface of the first cover 400A and the second cover 400B.

The unit cell 10 will now be described. Hereinafter, a case where the unit cell 10 is a polymer battery will be described, but the present invention is not limited thereto.

Referring to the embodiment shown in FIG. 4A, the unit cell 10 includes an electrode assembly (not shown), an electrode terminal 10*a*, and an accommodating unit 10*b*. The electrode assembly may include a positive plate, a negative plate, and a separator interposed between the positive plate and the negative plate. As shown in FIG. 4A, the electrode terminal 10*a* extends from the electrode assembly. In one embodiment, the accommodating unit 10*b* includes a receiving unit 10*b*1 accommodating the electrode assembly and a terrace portion 10*b*2 that covers at least a part of the electrode terminal 10*a*.

Figure 4B:
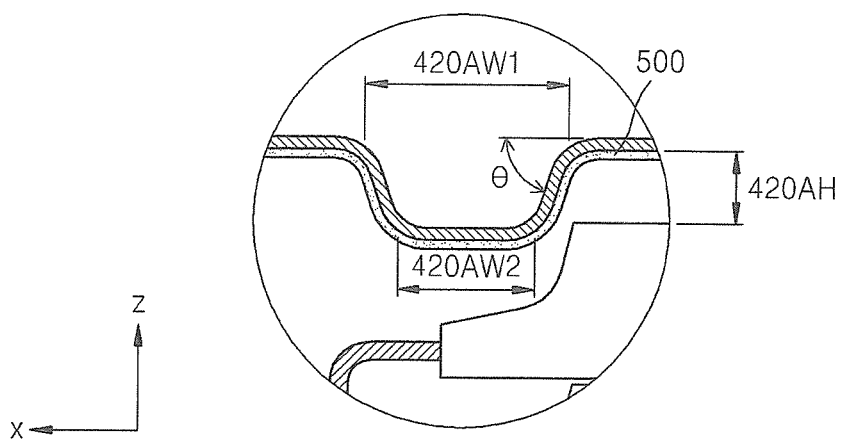
FIG. 4B is a schematic cross-sectional view of a part IVb of FIG. 4A.

In one embodiment, a second bead 420A protruding to follow the contours of the unit cell 10 in a direction perpendicular to the unit cell 10 is formed in the first cover 400A so as to correspond to the terrace portion 10*b*2. As shown in FIG. 4B, the second bead 420A has a second bead bottom width 420AW1, a second bead top width 420AW2, a second bead height 420AH, and a second bead angle θ. In one embodiment, the shape of the second bead 420A is determined according to the shape of the terrace portion 10*b*2 of the unit cell 10. For example, the second bead top width 420AW2 may be determined according to the length of the terrace portion 10*b*2 and an exposing extent of an exposed portion of the electrode terminal 10*a*. The second bead height 420AH may be determined in consideration of, for example, a thickness of the unit cell 10 and the position of the electrode terminal 10*a*. The second bead angle θ may be modified according to design conditions.

In one embodiment, the first bead 410A extends in a first direction, and the second bead 420A extends in a second direction. The first direction may be different from the second direction. For example, the first direction may be perpendicular to the second direction. Extending directions of the first bead 410A and the second bead 420A will now be described with reference to FIG. 1. As shown in FIG. 1, the first bead 410A extends in a lengthwise direction of the unit cell 10, that is, in an X-axis direction, in order to fix the unit cell 10. Also, the second bead 420A extends in a width direction of the unit cell 10, that is, a Y-axis direction, so as to correspond to the terrace portion 10b2 of the unit cell 10. In one embodiment, the lengthwise direction (the X-axis direction), which is a direction in which the first bead 410A extends, is different from and perpendicular to the width direction (the Y-axis direction) of the unit cell 10, which is a direction in which the second bead 420A extends.

As the second bead 420A is formed, movement of the unit cell 10 may be controlled in a lengthwise direction of the unit cell 10, that is, in an X-axis direction due to the terrace portion 10b2. That is, the second bead 420A may function as a dividing wall for suppressing movement of the unit cell 10 in the lengthwise direction, that is, in the X-axis direction.

The second bead height 420AH may be the same as the first bead height 410AH or may be equal to or greater than the first bead height 410AH. The first bead height 410AH and the second bead height 420AH may be determined according to an interval between the unit cells 10 and the shapes of the unit cell 10 and the terrace portion 10b2.

Since the first cover 400A is a thin metal plate having flexibility and elasticity, it may be difficult to maintain rigidity and flatness. However, rigidity and flatness may be increased by forming the first bead 410A, the second bead 420A, and the step 430A on the first cover 400A. In the current embodiment, although mainly the first cover 400A has been described, beads 410B and/or 420B and the step 430A may be formed in the second cover 400B.

Figure 5A:
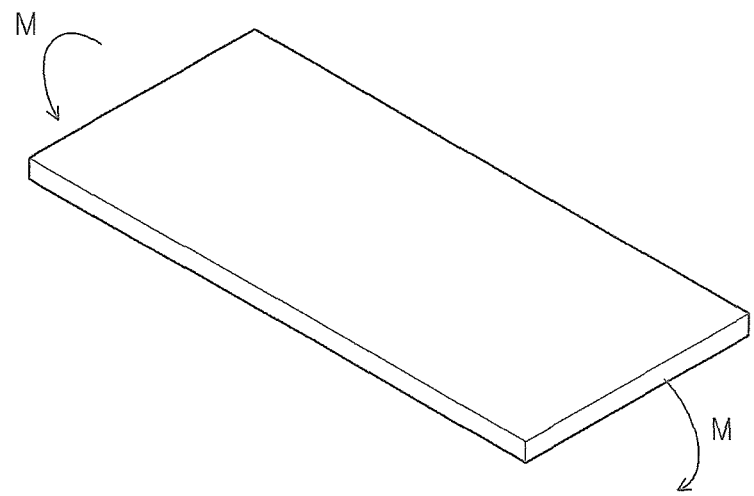
FIG. 5A is a schematic perspective view of a flat plate, according to an embodiment of the present invention.
Figure 5B:
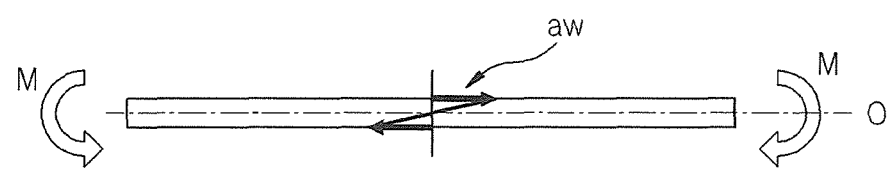
FIG. 5B is a schematic side view of the flat plate of FIG. 5A.
Figure 5C:
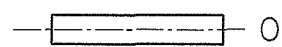
FIG. 5C is a schematic front view of the flat plate of FIG. 5A.
Figure 6A:
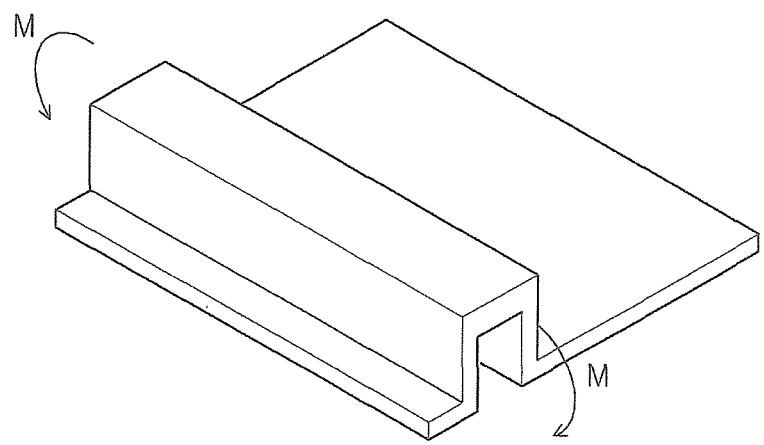
FIG. 6A is a schematic perspective view of a U-shaped bead, according to an embodiment of the present invention.
Figure 6B:
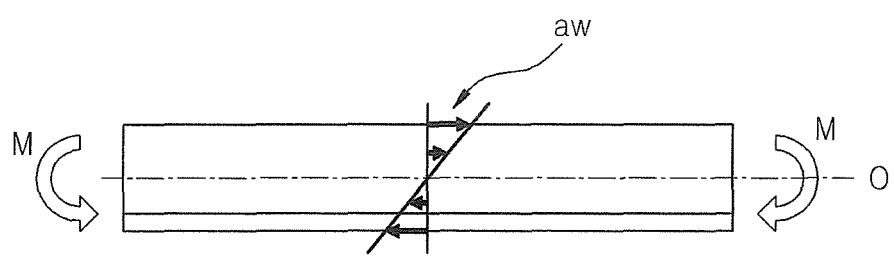
FIG. 6B is a schematic side view of the U-shaped bead of FIG. 6A.
Figure 6C:
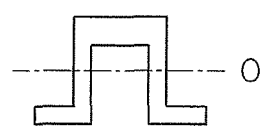
FIG. 6C is a schematic front view of the U-shaped bead of FIG. 6A.

FIG. 5A is a schematic perspective view of a flat plate, according to an embodiment of the present invention. FIG. 5B is a schematic side view of the flat plate of FIG. 5A. FIG. 5C is a schematic front view of the flat plate of FIG. 5A. FIG. 6A is a schematic perspective view of a U-shaped bead, according to an embodiment of the present invention. FIG. 6B is a schematic side view of the U-shaped bead of FIG. 6A. FIG. 6C is a schematic front view of the U-shaped bead of FIG. 6A. In FIG. 5B and FIG. 6B, an arrow aw denotes bending stress. The bending stress may be represented by Equation 1 below.

$$\sigma = \frac{M \cdot c}{I} \quad (1)$$

In Equation 1, σ denotes bending stress, M denotes a bending moment, c denotes a distance between a central axis O and an outer surface where a maximum stress occurs, and I denotes a moment of inertia. As shown in Equation 1, the bending stress σ is inversely proportional to the moment of inertia I, and thus the bending stress σ may be reduced by increasing the moment of inertia I. In this regard, the moment of inertia I at one point increases in proportion to the square of the distance from the central axis O. Accordingly, if a bead is formed in a flat plane, the moment of inertia I increases, and thus the bending stress σ may be decreased. Referring to FIGS. 5A through 6C, the arrow aw of the bending stress σ is formed to be small in FIG. 6B where the bead is formed. Accordingly, rigidity may be increased by forming the first bead 410A, the second bead 420A, and the step 430A on the first cover 400A, thereby increasing flatness of the first cover 400A.

As shown in FIG. 1, if a first bending moment M1 is applied to the first cover 400A, the first cover 400A receives a relatively small bending stress due to the first bead 410A. Also, if a second bending moment M2 is applied to the first cover 400A, the first cover 400A receives a relatively small bending stress due to the second bead 420A. The step 430A formed between the first region cover 400A1 and the second region cover 400A2 may be regarded as one bead formed on the first cover 400A. That is, as shown in FIG. 2A, the step 430A formed between the first region cover 400A1 and the second region cover 400A2 forms one bead along the periphery of the first cover 400A. Accordingly, the step 430A formed between the first region cover 400A1 and the second region cover 400A2 may decrease a bending stress with respect to the first bending moment M1 and the second bending moment M2. Thus, the step 430A, the first bead 410A, and the second bead 420A may improve rigidity and flatness of the cover 400.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A battery pack comprising:
a core pack comprising a unit cell;
a frame accommodating the core pack; and
a cover covering the core pack, the cover comprising a metal plate including a first region cover corresponding to at least a part of the unit cell and a second region cover extending from the first region cover, wherein the second region cover is formed to be on a different plane than the first region cover such that a step is formed between the first region cover and the second region cover, the second region cover corresponding to at least one edge of the core pack,
wherein the first region cover of the metal plate comprises a bead projecting toward the unit cell and extending along a direction corresponding to the unit cell, an outer surface of the metal plate at the bead projecting toward the unit cell and having a height at a peak of the bead greater than that of each of portions of the outer surface adjacent opposite sides of the bead,
wherein the metal plate comprises an edge portion coupled to the frame, the bead being spaced apart from the edge portion.

2. The battery pack of claim 1,
wherein the core pack comprises a plurality of unit cells, and
wherein the bead comprises a first bead formed to correspond to a space between the unit cells.

3. The battery pack of claim 1,
wherein the unit cell comprises an accommodating unit comprising a receiving unit accommodating an electrode assembly and a terrace portion covering a part of an electrode terminal extending from the electrode assembly, and
wherein the bead comprises a second bead formed to correspond to the terrace portion.

4. The battery pack of claim 3,
wherein the core pack comprises a plurality of unit cells; and
wherein the bead comprises a first bead formed to correspond to a space between the unit cells, the first head extends in a first direction, the second bead extends in a second direction, and the first direction is different from the second direction.

5. The battery pack of claim 4, wherein the first direction is perpendicular to the second direction.

6. The batter pack of claim 4, wherein a height of the first bead is the same as a height of the second bead.

7. The battery pack of claim 4, wherein a height of the first bead is equal to or less than a height of the second bead.

8. The battery pack of claim 1, wherein the first region cover is closer to the unit cell than the second region cover.

9. The battery pack of claim 1, wherein the cover comprises a first cover covering one side of the core pack and a second cover covering another side of the core pack.

10. The battery pack of claim 1, further comprising:
a protection circuit module electrically connected to the core pack,
wherein the frame comprises a first region accommodating the core pack and a second region accommodating the protection circuit module, and
wherein the cover covers the core pack and the protection circuit module.

11. The battery pack of claim 1, wherein the cover comprises stainless steel.

12. The battery pack of claim 1, further comprising an insulating member between the core pack and the cover.

13. The battery pack of claim 12, wherein the insulating member comprises a polyamide tape.

14. The battery pack of claim 1, wherein the unit cell comprises a polymer battery.

15. The battery pack of claim 1, wherein the battery pack is configured to be used in a portable computer.

* * * * *